(12) United States Patent
Tseng et al.

(10) Patent No.: US 12,392,993 B2
(45) Date of Patent: Aug. 19, 2025

(54) OPTICAL IMAGING LENS

(71) Applicant: Calin Technology Co., Ltd., Taichung (TW)

(72) Inventors: Yung-Chieh Tseng, Taichung (TW); Pei-Lun Chen, Nantou County (TW); Chia-Tsun Hung, Changhua County (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 523 days.

(21) Appl. No.: 17/840,828

(22) Filed: Jun. 15, 2022

(65) Prior Publication Data

US 2023/0314762 A1   Oct. 5, 2023

(30) Foreign Application Priority Data

Apr. 1, 2022  (TW) .................................. 111112826

(51) Int. Cl.
*G02B 9/60*     (2006.01)
*G02B 13/00*    (2006.01)
*G02B 13/18*    (2006.01)

(52) U.S. Cl.
CPC ........... *G02B 9/60* (2013.01); *G02B 13/0045* (2013.01); *G02B 13/18* (2013.01)

(58) Field of Classification Search
CPC ... G02B 9/60; G02B 9/62; G02B 9/64; G02B 9/04; G02B 9/10; G02B 13/002; G02B 13/0045; G02B 13/18

(Continued)

(56) References Cited

U.S. PATENT DOCUMENTS 6,236,521 B1   5/2001  Nanba
9,753,248 B2   9/2017  Asami
(Continued)

FOREIGN PATENT DOCUMENTS

CN   101089672 A    12/2007
CN   110501808 A  * 11/2019
(Continued)

OTHER PUBLICATIONS

Gross et al., Handbook of Optical Systems, 2007, Wiley, vol. 3, pp. 223-224 (Year: 2007).*

(Continued)

*Primary Examiner* — Bumsuk Won
*Assistant Examiner* — Alex Park Rickel
(74) *Attorney, Agent, or Firm* — Birch, Stewart, Kolasch & Birch, LLP (57) ABSTRACT

An optical imaging lens, in order from an object side to an image side along an optical axis, includes a first lens assembly, an aperture, and a second lens assembly. The first lens assembly includes a first lens having negative refractive power and a second lens having positive refractive power. The second lens assembly includes a third lens having positive refractive power, a fourth lens having negative refractive power, and a fifth lens having positive refractive power. The optical imaging lens satisfies: $-5<fg1/F<-3.5$ and $1.5<fg2/F<2.5$; F is a focal length of the optical imaging lens; fg1 is a focal length of the first lens assembly; fg2 is a focal length of the second lens assembly, thereby achieving the effect of high image quality.

13 Claims, 6 Drawing Sheets

(58) Field of Classification Search
USPC .............. 359/717, 714, 713, 763, 7, 70, 756
See application file for complete search history.

(56) References Cited

U.S. PATENT DOCUMENTS

| | | | |
|---|---|---|---|
| 10,606,028 B2* | 3/2020 | Chen ........................ | G02B 9/62 |
| 2016/0124183 A1* | 5/2016 | Hsu .................... | G02B 13/0045 |
| | | | 359/714 |
| 2018/0052302 A1* | 2/2018 | Lin ...................... | G02B 27/005 |
| 2019/0271832 A1* | 9/2019 | Kuo .................... | G02B 13/0045 |

FOREIGN PATENT DOCUMENTS

| | | | | |
|---|---|---|---|---|
| CN | 112147751 A | * | 12/2020 | ......... G02B 13/0045 |
| TW | 201317610 A1 | | 5/2013 | |
| TW | 202037960 A | | 10/2020 | |

OTHER PUBLICATIONS

English translation of the Taiwanese Search Report for Taiwanese Application No. 111112826, dated Oct. 12, 2022.

\* cited by examiner

OPTICAL IMAGING LENS

BACKGROUND OF THE INVENTION

Technical Field

The present invention generally relates to an optical image capturing system, and more particularly to an optical imaging lens, which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality.

The present invention provides an optical imaging lens, in order from an object side to an image side along an optical axis, including a first lens assembly, an aperture, and a second lens assembly, wherein the first lens assembly includes, in order from the object side to the image side along the optical axis, a first lens having negative refractive power and a second lens which is a biconvex lens having positive refractive power, wherein an object-side surface of the first lens is a convex surface toward the object side, and an image-side surface of the first lens is a concave surface toward the image side; the object-side surface of the first lens and/or the image-side surface of the first lens are/is an aspheric surface; the object-side surface of the second lens and/or the image-side surface of the second lens are/is an aspheric surface. The second lens assembly includes, in order from the object side to the image side along the optical axis, a third lens which is a biconvex lens having positive refractive power, a fourth lens that is a biconcave lens having negative refractive power, and a fifth lens that is a biconvex lens having positive refractive power, wherein an object-side surface of the third lens and/or an image-side surface of the third lens are/is an aspheric surface; an object-side surface of the fourth lens and/or an image-side surface of the fourth lens are/is an aspheric surface; an object-side surface of the fifth lens and/or an image-side surface of the fifth lens are/is an aspheric surface. The optical imaging lens satisfies: $-5<fg1/F<-3.5$; F is a focal length of the optical imaging lens and fg1 is a focal length of the first lens assembly.

The present invention further provides an optical imaging lens, in order from an object side to an image side along an optical axis, including a first lens assembly, an aperture, and a second lens assembly, wherein the first lens assembly includes, in order from the object side to the image side along the optical axis, a first lens having negative refractive power and a second lens that is a biconvex lens having positive refractive power, wherein an object-side surface of the first lens is a convex surface toward the object side, and an image-side surface of the first lens is a concave surface toward the image side; the object-side surface of the first lens and/or the image-side surface of the first lens are/is an aspheric surface; an object-side surface of the second lens and/or an image-side surface of the second lens are/is an aspheric surface. The second lens assembly includes, in order from the object side to the image side along the optical axis, a third lens which is a biconvex lens having positive refractive power, a fourth lens that is a biconcave lens having negative refractive power, and a fifth lens that is a biconvex lens having positive refractive power, wherein an object-side surface of the third lens and/or an image-side surface of the third lens are/is an aspheric surface; an object-side surface of the fourth lens and/or an image-side surface of the fourth lens are/is an aspheric surface; an object-side surface of the fifth lens and/or an image-side surface of the fifth lens are/is an aspheric surface. The optical imaging lens satisfies: $1.5<fg2/F<2.5$; F is a focal length of the optical imaging lens and fg2 is a focal length of the second lens assembly.

With the aforementioned design, the optical imaging lens could effectively improve an aberration of the optical imaging lens by utilizing the refractive power arrangement, and the conditions of the fifth lenses, thereby achieving the effect of high image quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
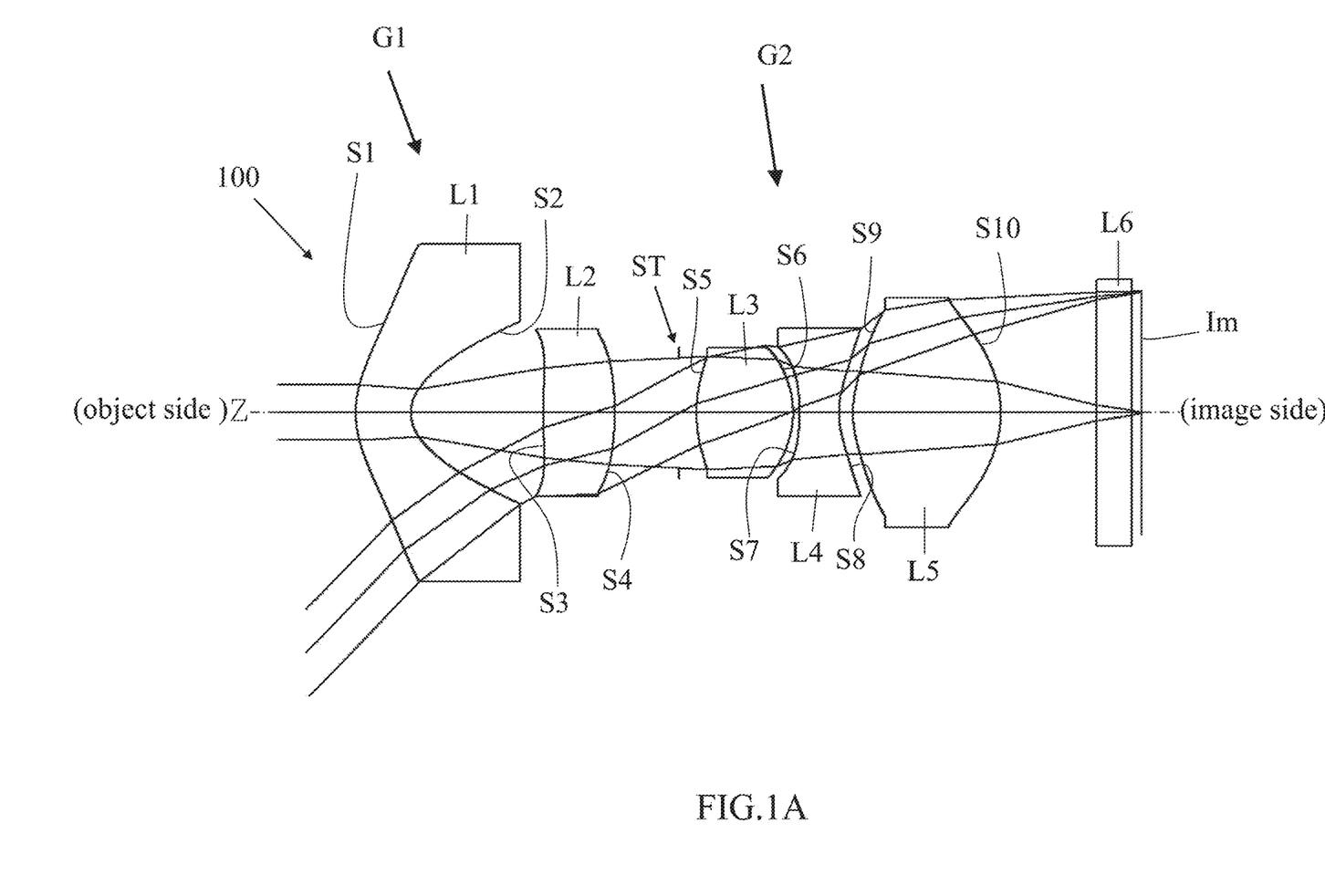
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first lens assembly G1, an aperture ST, and a second lens assembly G2. In the current embodiment, the first lens assembly G1 includes, in order along the optical axis Z from the object side to the image side, a first lens L1 and a second lens L2; the second lens assembly G2 includes, in order along the optical axis Z from the object side to the image side, a third lens L3, a fourth lens L4, and a fifth lens L5.

The first lens L1 is a negative meniscus with negative refractive power; an object-side surface S1 of the first lens L1 is a convex surface toward the object side, and an image-side surface S2 of the first lens L1 is a concave surface toward the image side. The object-side surface S1, the image-side surface S2, or both of the object-side surface S1 and the image-side surface S2 of the first lens L1 are aspheric surfaces. As shown in FIG. 1A, in the current embodiment, a part of a surface of the first lens L1 toward the image side is recessed to form the image-side surface S2, and the optical axis Z passes through the object-side surface S1 and the image-side surface S2 of the first lens L1, and both of the object-side surface S1 and the image-side surface S2 of the first lens L1 are aspheric surfaces.

The second lens L2 is a biconvex lens (i.e., both of an object-side surface S3 of the second lens L2 and an image-side surface S4 of the second lens L2 are convex surfaces) with positive refractive power, wherein the object-side surface S3, the image-side surface S4, or both of the object-side surface S3 and the image-side surface S4 of the second lens L2 are aspheric surfaces. As shown in FIG. 1A, in the current embodiment, the optical axis Z passes through the object-side surface S3 and the image-side surface S4 of the second lens L2, and both of the object-side surface S3 and the image-side surface S4 of the second lens L2 are aspheric surfaces.

The third lens is a biconvex lens (i.e., both of an object-side surface S5 of the third lens L3 and an image-side surface S6 of the third lens L3 are convex surfaces) with positive refractive power, wherein the object-side surface S5, the image-side surface S6, or both of the object-side surface S5 and the image-side surface S6 of the third lens L3 are aspheric surfaces. As shown in FIG. 1A, in the current embodiment, the optical axis Z passes through the object-side surface S5 and the image-side surface S6 of the third lens L3, and both of the object-side surface S5 and the image-side surface S6 of the third lens L3 are aspheric surfaces.

The fourth lens L4 is a biconcave lens (i.e., both of an object-side surface S7 of the fourth lens L4 and an image-side surface S8 of the fourth lens L4 are concave surfaces) with negative refractive power, wherein the object-side surface S7, the image-side surface S8, or both of the object-side surface S7 and the image-side surface S8 of the fourth lens L4 are aspheric surfaces. As shown in FIG. 1A, in the current embodiment, the optical axis Z passes through the object-side surface S7 and the image-side surface S8 of the fourth lens L4, and both of the object-side surface S7 and the image-side surface S8 of the fourth lens L4 are aspheric surfaces.

The fifth lens L5 is a biconvex lens (i.e., both of an object-side surface S9 of the fifth lens L5 and an image-side surface S10 of the fifth lens L5 are convex surfaces) with positive refractive power, wherein the object-side surface S9, the image-side surface S10, or both of the object-side surface S9 and the image-side surface S10 of the fifth lens L5 are aspheric surfaces. As shown in FIG. 1A, in the current embodiment, the optical axis Z passes through the object-side surface S9 and the image-side surface S10 of the fifth lens L5, and both of the object-side surface S9 and the image-side surface S10 of the fifth lens L5 are aspheric surfaces.

Additionally, the optical imaging lens 100 further includes an infrared filter L6 disposed between the fifth lens L5 and an image plane Im of the optical imaging lens 100, thereby filtering out excess infrared rays in an image light passing through the first lens assembly G1 and the second lens assembly G2.

In order to keep the optical imaging lens 100 in good optical performance and high imaging quality, the optical imaging lens 100 further satisfies:

(1) $-5 < fg1/F < -3.5$;
(2) $-2 < f1/F < -1$; $3.5 < f2/F < 5.5$;
(3) $1.5 < fg2/F < 2.5$;
(4) $1 < f3/F < 1.8$; $-1.5 < f4/F < -0.5$; $1 < f5/F < 2$;
(5) $-3 < fg1/fg2 < -1.5$;

wherein F is a focal length of the optical imaging lens 100; f1 is a focal length of the first lens L1; f2 is a focal length of the second lens L2; f3 is a focal length of the third lens L3; f4 is a focal length of the fourth lens L4; f5 is a focal length of the fifth lens L5; fg1 is a focal length of the first lens assembly G1; fg2 is a focal length of the second lens assembly G2.

Parameters of the optical imaging lens 100 of the first embodiment of the present invention are listed in following Table 1, including the focal length F of the optical imaging lens 100 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 1

F = 2.773 mm; Fno = 1.9; FOV = 92 deg

| Surface | R(mm) | D(mm) | Nd | Vd | Focal length | Note |
|---|---|---|---|---|---|---|
| S1 | 3.08 | 1.26 | 1.53 | 56.28 | −4.11 | L1 |
| S2 | 1.09 | 3.03 | | | | |
| S3 | 20.39 | 1.63 | 1.64 | 23.97 | 11.22 | L2 |
| S4 | −10.74 | 1.49 | | | | |
| ST | Infinity | 0.39 | | | | ST |
| S5 | 4.47 | 2.21 | 1.53 | 56.28 | 3.39 | L3 |
| S6 | −2.46 | 0.15 | | | | |
| S7 | −5.73 | 0.90 | 1.64 | 23.97 | −2.44 | L4 |
| S8 | 2.28 | 0.32 | | | | |
| S9 | 2.76 | 3.38 | 1.53 | 56.28 | 3.61 | L5 |
| S10 | −3.54 | 0.53 | | | | |

TABLE 1-continued

F = 2.773 mm; Fno = 1.9; FOV = 92 deg

| Surface | R(mm) | D(mm) | Nd | Vd | Focal length | Note |
|---|---|---|---|---|---|---|
| S11 | Infinity | 0.3 | 1.52 | 64.17 | | Infrared filter L6 |
| Im | 3.08 | 1.26 | 1.53 | 56.28 | −4.11 | Im |

It can be seen from Table 1 that, in the current embodiment, the focal length F of the optical imaging lens 100 is 2.773 mm, and the Fno is 1.9, and the FOV is 92 degrees, wherein f1=−4.11 mm; f2=11.22 mm; f3=3.39 mm; f4=−2.44 mm; f5=3.61 mm; fg1=−11.543 mm; fg2=5.08 mm.

Additionally, based on the above detailed parameters, detailed values of the aforementioned conditional formula in the first embodiment are as follows: fg1/F=−4.16; f1/F=−1.48; f2/F=4.05; fg2/F=1.83; f3/F=1.22; f4/F=−0.88; f5/F=1.3; fg1/fg2=−2.27.

With the aforementioned design, the first lens assembly G1 and the second lens assembly G2 satisfy the aforementioned conditions (1) to (5) of the optical imaging lens 100.

Moreover, an aspheric surface contour shape Z of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 100 according to the first embodiment could be obtained by following formula:

$$Z = \frac{ch^2}{1 + \sqrt{1-(1+k)c^2h^2}} + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A4, A6, A8, A10, A12, A14, and A16 respectively represents different order coefficient of h.

The conic constant k of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 100 according to the first embodiment and the different order coefficient of A4, A6, A8, A10, A12, A14, and A16 are listed in following Table 2 and Table 3:

TABLE 2

| Surface | S1 | S2 | S3 | S4 | S5 |
|---|---|---|---|---|---|
| k | −9.5654E−01 | 1.0910E+00 | −8.5356E+01 | 5.8401E+00 | 5.8401E+00 |
| A4 | −1.1363E−02 | −9.6941E−01 | −4.6763E−03 | −6.3614E−03 | −6.3614E−03 |
| A6 | 6.0952E−04 | −9.3341E−03 | −1.3360E−03 | −6.8122E−04 | −6.8122E−04 |
| A8 | −2.1269E−05 | 1.8485E−03 | 6.9672E−05 | 5.5874E−05 | 5.5874E−05 |
| A10 | 4.4885E−07 | −7.0966E−04 | −5.0964E−05 | 1.0655E−05 | 1.0655E−05 |
| A12 | −3.7516E−09 | 1.2399E−04 | 6.5704E−06 | −1.1859E−06 | −1.1859E−06 |
| A14 | 0 | −9.0997E−06 | 0 | 0 | 0 |
| A16 | 0 | 0 | 0 | 0 | 0 |

TABLE 3

| Surface | S6 | S7 | S8 | S9 | S10 |
|---|---|---|---|---|---|
| k | −9.8164E+00 | −7.8110E+00 | −1.1433E+01 | −1.1969E+01 | −1.7673E−01 |
| A4 | −2.5103E−02 | −1.0317E−02 | −2.0479E−04 | −9.2539E−04 | 4.3153E−04 |
| A6 | 1.1097E−04 | −1.2818E−02 | −7.1053E−04 | 7.7713E−04 | 4.7055E−04 |
| A8 | −3.2003E−04 | 3.9306E−03 | 3.5586E−04 | −7.0750E−05 | −4.7252E−05 |
| A10 | 1.3035E−04 | −8.8094E−04 | −6.1008E−05 | 2.8765E−06 | 4.9825E−06 |
| A12 | −3.1514E−05 | 9.5055E−05 | 3.8208E−06 | −2.4795E−17 | −2.5536E−17 |
| A14 | 0 | 0 | 0 | 0 | 0 |
| A16 | 0 | 0 | 0 | 0 | 0 |

Figure 1B:
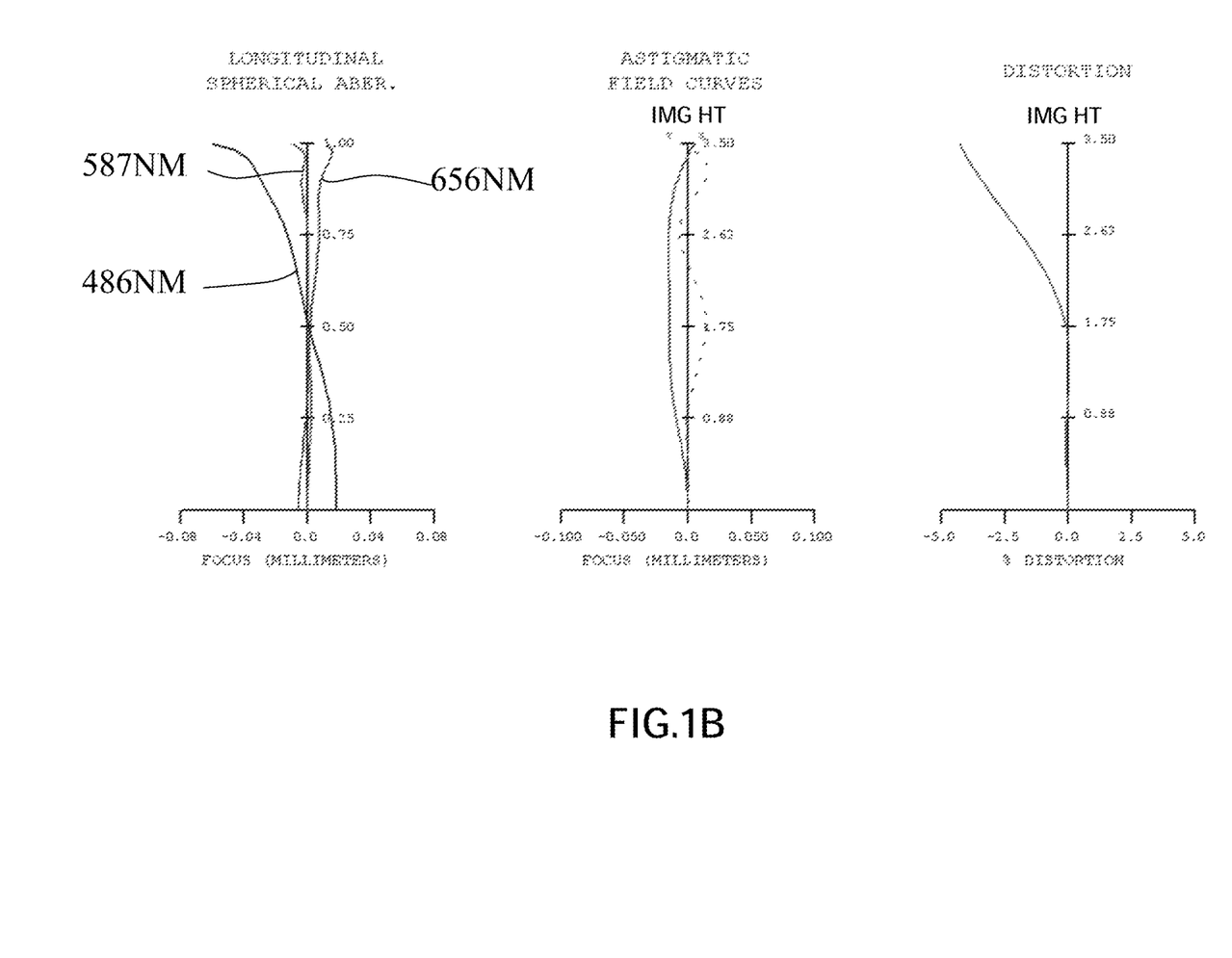
FIG. 1B shows curve diagrams of longitudinal spherical aberration, astigmatic field curves, and distortion in order from left to right according to the first embodiment of the present invention.

Taking optical simulation data to verify the imaging quality of the optical imaging lens 100, wherein FIG. 1B is a diagram showing the longitudinal spherical aberration, astigmatic field curves, and distortion according to the first embodiment, which could effectively enhance image quality.

Figure 2A:
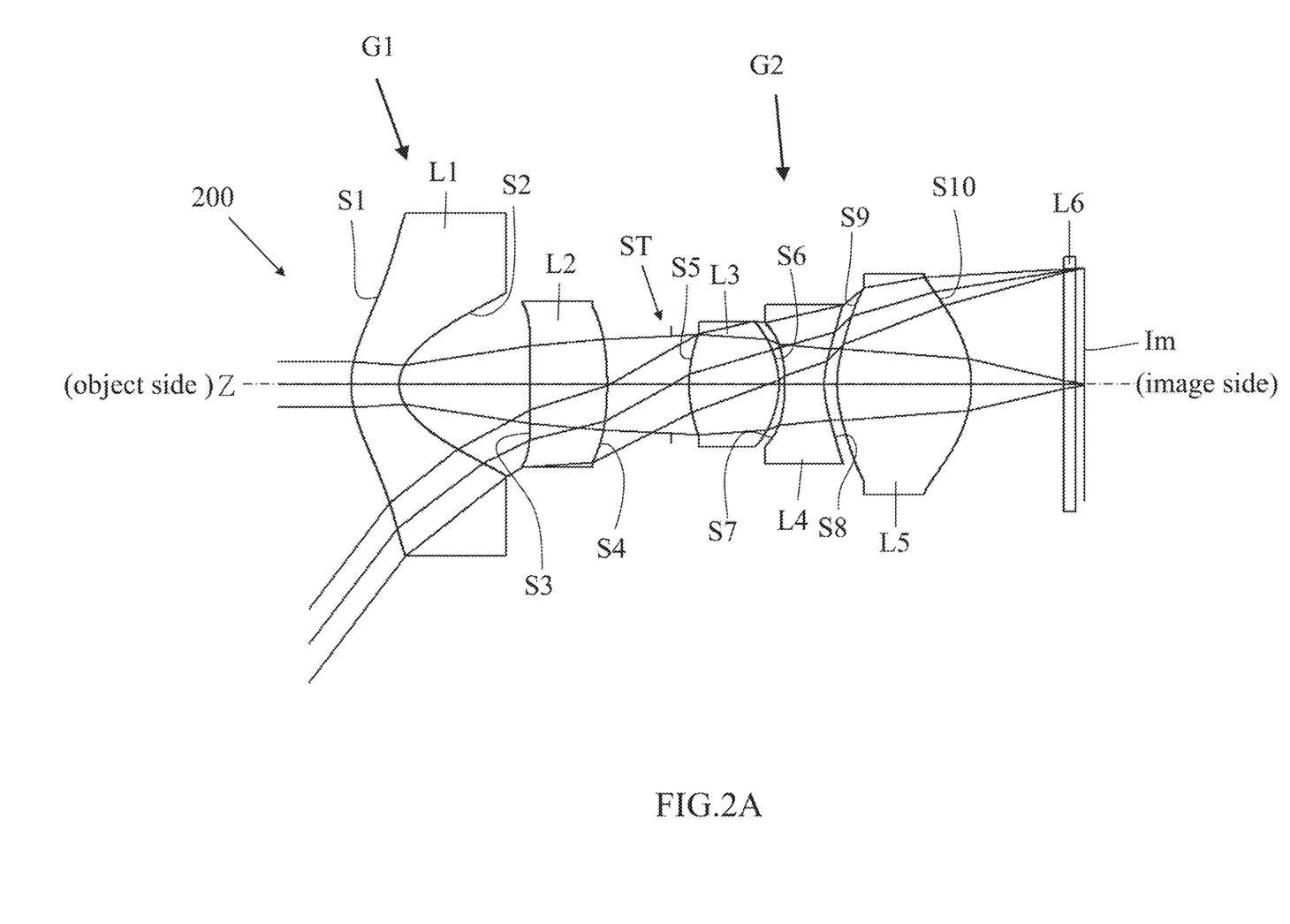
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first lens assembly G1, an aperture ST, and a second lens assembly G2. In the current embodiment, the first lens assembly G1 includes, in order along the optical axis Z from the object side to the image side, a first lens L1 and a second lens L2; the second lens assembly G2 includes, in order along the optical axis Z from the object side to the image side, a third lens L3, a fourth lens L4, and a fifth lens L5.

The first lens L1 is a negative meniscus with negative refractive power; an object-side surface S1 of the first lens L1 is a convex surface toward the object side, and an image-side surface S2 of the first lens L1 is a concave surface toward the image side. The object-side surface S1, the image-side surface S2, or both of the object-side surface S1 and the image-side surface S2 of the first lens L1 are aspheric surfaces. As shown in FIG. 2A, in the current embodiment, a part of a surface of the first lens L1 toward the image side is recessed to form the image-side surface S2, and the optical axis Z passes through the object-side surface S1 and the image-side surface S2 of the first lens L1, and both of the object-side surface S1 and the image-side surface S2 of the first lens L1 are aspheric surfaces.

The second lens L2 is a biconvex lens (i.e., both of an object-side surface S3 of the second lens L2 and an image-side surface S4 of the second lens L2 are convex surfaces) with positive refractive power, wherein the object-side surface S3, the image-side surface S4, or both of the object-side surface S3 and the image-side surface S4 of the second lens L2 are aspheric surfaces. As shown in FIG. 2A, in the current embodiment, the optical axis Z passes through the object-side surface S3 and the image-side surface S4 of the second lens L2, and both of the object-side surface S3 and the image-side surface S4 of the second lens L2 are aspheric surfaces.

The third lens is a biconvex lens (i.e., both of an object-side surface S5 of the third lens L3 and an image-side surface S6 of the third lens L3 are convex surfaces) with positive refractive power, wherein the object-side surface S5, the image-side surface S6, or both of the object-side surface S5 and the image-side surface S6 of the third lens L3 are aspheric surfaces. As shown in FIG. 2A, in the current embodiment, a part of a surface of the third lens L3 toward the object side is convex to form the object-side surface S5, and the optical axis Z passes through the object-side surface S5 and the image-side surface S6 of the third lens L3, and both of the object-side surface S5 and the image-side surface S6 of the third lens L3 are aspheric surfaces.

The fourth lens L4 is a biconcave lens (i.e., both of an object-side surface S7 of the fourth lens L4 and an image-side surface S8 of the fourth lens L4 are concave surfaces) with negative refractive power, wherein the object-side surface S7, the image-side surface S8, or both of the object-side surface S7 and the image-side surface S8 of the fourth lens L4 are aspheric surfaces. As shown in FIG. 2A, in the current embodiment, a part of a surface of the fourth lens L4 toward the object side is recessed to form the object-side surface S7, and the optical axis Z passes through the object-side surface S7 and the image-side surface S8 of the fourth lens L4, and both of the object-side surface S7 and the image-side surface S8 of the fourth lens L4 are aspheric surfaces.

The fifth lens L5 is a biconvex lens (i.e., both of an object-side surface S9 of the fifth lens L5 and an image-side surface S10 of the fifth lens L5 are convex surfaces) with positive refractive power, wherein the object-side surface S9, the image-side surface S10, or both of the object-side surface S9 and the image-side surface S10 of the fifth lens L5 are aspheric surfaces. As shown in FIG. 2A, in the current embodiment, a part of a surface of the fifth lens L5 toward the object side is recessed to form the object-side surface S9, and the optical axis Z passes through the object-side surface S9 and the image-side surface S10 of the fifth lens L5, and both of the object-side surface S9 and the image-side surface S10 of the fifth lens L5 are aspheric surfaces.

Additionally, the optical imaging lens 200 further includes an infrared filter L6, wherein the infrared filter L6 is disposed between the fifth lens L5 and an image plane Im of the optical imaging lens 200, thereby filtering out excess infrared rays in an image light passing through the first lens assembly G1 and the second lens assembly G2.

In order to keep the optical imaging lens 200 in good optical performance and high imaging quality, the optical imaging lens 200 further satisfies:

(1) $-5 < fg1/F < -3.5$;
(2) $-2 < f1/F < -1$; $3.5 < f2/F < 5.5$;
(3) $1.5 < fg2/F < 2.5$;
(4) $1 < f3/F < 1.8$; $-1.5 < f4/F < -0.5$; $1 < f5/F < 2$;
(5) $-3 < fg1/fg2 < -1.5$;

wherein F is a focal length of the optical imaging lens 200; f1 is a focal length of the first lens L1; f2 is a focal length of the second lens L2; f3 is a focal length of the third lens L3; f4 is a focal length of the fourth lens L4; f5 is a focal length of the fifth lens L5; fg1 is a focal length of the first lens assembly G1; fg2 is a focal length of the second lens assembly G2.

Parameters of the optical imaging lens 200 of the second embodiment of the present invention are listed in following Table 4, including the focal length F of the optical imaging lens 200 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 4

| Surface | R(mm) | D(mm) | Nd | Vd | Focal length | Note |
|---|---|---|---|---|---|---|
| S1 | 2.95 | 1.22 | 1.53 | 56.28 | −3.960 | L1 |
| S2 | 1.05 | 3.30 | | | | |
| S3 | 34.77 | 1.97 | 1.64 | 23.97 | 12.212 | L2 |
| S4 | −9.86 | 1.61 | | | | |
| ST | Infinity | 0.45 | | | | ST |
| S5 | 4.20 | 2.28 | 1.53 | 56.28 | 3.287 | L3 |
| S6 | −2.40 | 0.15 | | | | |
| S7 | −4.92 | 1.00 | 1.64 | 23.97 | −2.402 | L4 |
| S8 | 2.42 | 0.32 | | | | |
| S9 | 2.93 | 3.40 | 1.53 | 56.28 | 3.64 | L5 |
| S10 | −3.34 | 2.33 | | | | |
| S11 | Infinity | 0.3 | 1.52 | 64.17 | | Infrared filter L6 |
| Im | Infinity | 0.23 | | | | Im |

F = 2.505 mm; Fno = 2.0; FOV = 100 deg

It can be seen from Table 5 that, in the second embodiment, the focal length (F) of the optical imaging lens 200 is 2.505 mm, and the Fno is 2.0, and the FOV is 100 degrees, wherein f1=−3.960 mm; f2=−12.212 mm; f3=3.287 mm; f4=−2.402 mm; f5=3.64 mm; fg1=−10.598 mm; fg2=5.116 mm.

Additionally, based on the above detailed parameters, detailed values of the aforementioned conditional formula in the second embodiment are as follows: fg1/F=−4.23; f1/F= −1.58; f2/F=4.88; fg2/F=2.04; f3/F=1.31; f4/F=−0.96; f5/F=1.45; fg1/fg2=−2.07.

With the aforementioned design, the first lens assembly G1 and the second lens assembly G2 satisfy the aforementioned conditions (1) to (5) of the optical imaging lens 200.

Moreover, an aspheric surface contour shape Z of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 200 according to the second embodiment could be obtained by following formula:

$$Z = \frac{ch^2}{1+\sqrt{1-(1+k)c^2h^2}} + A_4h^4 +$$
$$A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A4, A6, A8, A10, A12, A14, and A16 respectively represents different order coefficient of h.

The conic constant k of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 200 according to the second embodiment and the different order coefficient of A4, A6, A8, A10, A12, A14, and A16 are listed in following Table 5 and Table 6:

TABLE 5

| Surface | S1 | S2 | S3 | S4 | S5 |
|---|---|---|---|---|---|
| k | −1.0434E+00 | −9.6860E−01 | 6.3714E+01 | −6.8107E−01 | −3.5563E+00 |
| A4 | −1.1776E−02 | −7.7736E−03 | −3.7826E−03 | −5.0932E−03 | 5.0408E−03 |
| A6 | 6.1239E−04 | 1.1883E−03 | −1.1414E−03 | −7.6155E−04 | 2.4876E−05 |
| A8 | −2.0953E−05 | −5.7703E−04 | 1.0590E−04 | 6.4089E−05 | −1.0729E−03 |
| A10 | 4.4041E−07 | 8.5018E−05 | −6.3261E−05 | 1.0870E−05 | 5.9231E−04 |
| A12 | −4.0258E−09 | −6.6305E−06 | 7.1856E−06 | −1.1859E−06 | −1.7651E−04 |
| A14 | 0 | 0 | 0 | 0 | 0 |
| A16 | 0 | 0 | 0 | 0 | 0 |

TABLE 6

| Surface | S6 | S7 | S8 | S9 | S10 |
|---|---|---|---|---|---|
| k | −8.0512E+00 | −5.2887E+00 | −1.1344E+01 | −1.2063E+01 | −1.6441E−01 |
| A4 | −2.3600E−02 | −1.0221E−02 | −6.3097E−04 | −1.2613E−03 | 1.2249E−03 |
| A6 | −6.4612E−05 | −1.2451E−02 | −8.8822E−04 | 8.4810E−04 | 5.6380E−04 |
| A8 | −3.9526E−04 | 3.8414E−03 | 4.1276E−04 | −7.3089E−05 | −4.1593E−05 |
| A10 | 1.2447E−04 | −8.7349E−04 | −6.4061E−05 | 2.6903E−06 | 4.7313E−06 |
| A12 | −3.1514E−05 | 9.4800E−05 | 3.7356E−06 | −1.4235E−17 | −2.3963E−17 |
| A14 | 0 | 0 | 0 | 0 | 0 |
| A16 | 0 | 0 | 0 | 0 | 0 |

Figure 2B:
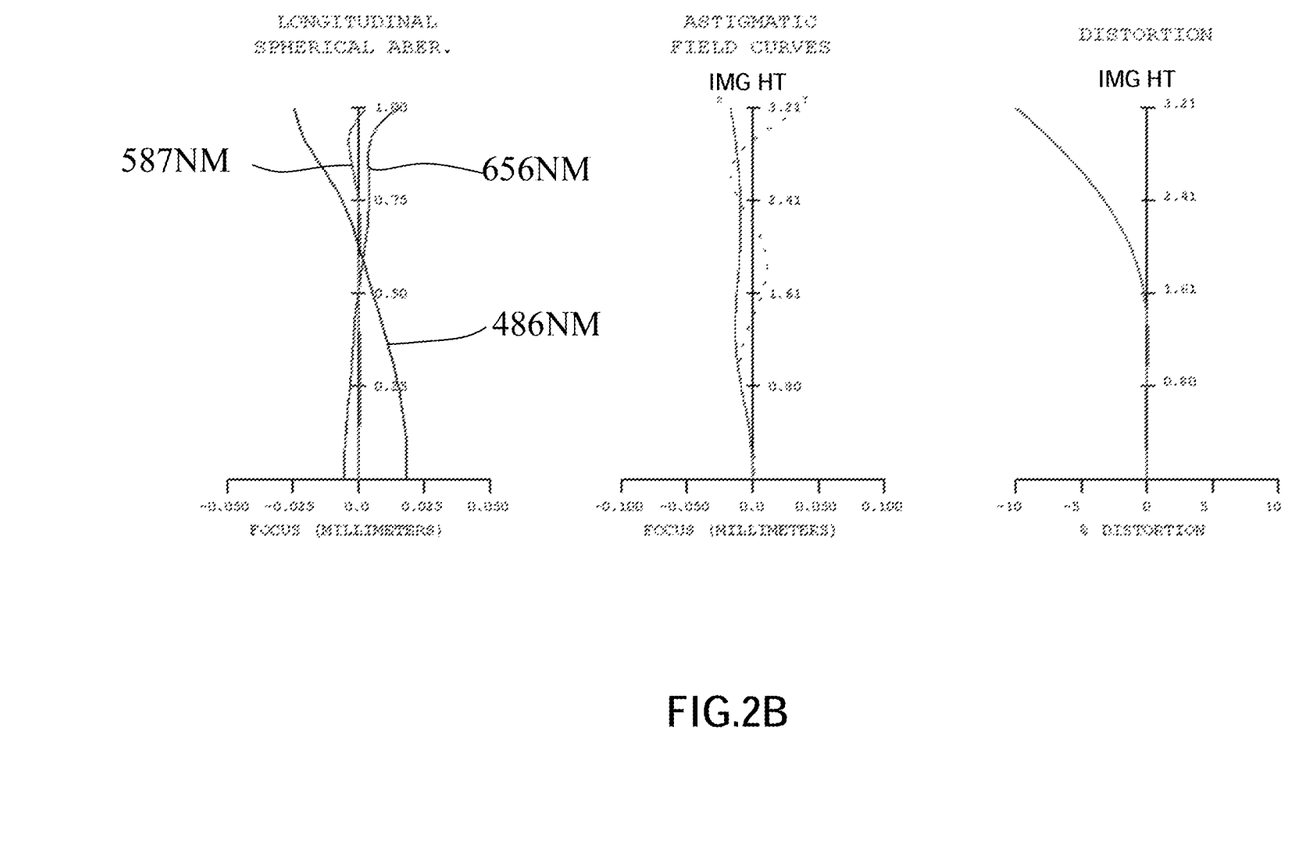
FIG. 2B shows curve diagrams of longitudinal spherical aberration, astigmatic field curves, and distortion in order from left to right according to the second embodiment of the present invention.

Taking optical simulation data to verify the imaging quality of the optical imaging lens 200, wherein FIG. 2B is a diagram showing the longitudinal spherical aberration, astigmatic field curves, and distortion according to the first embodiment, which could effectively enhance image quality.

Figure 3A:
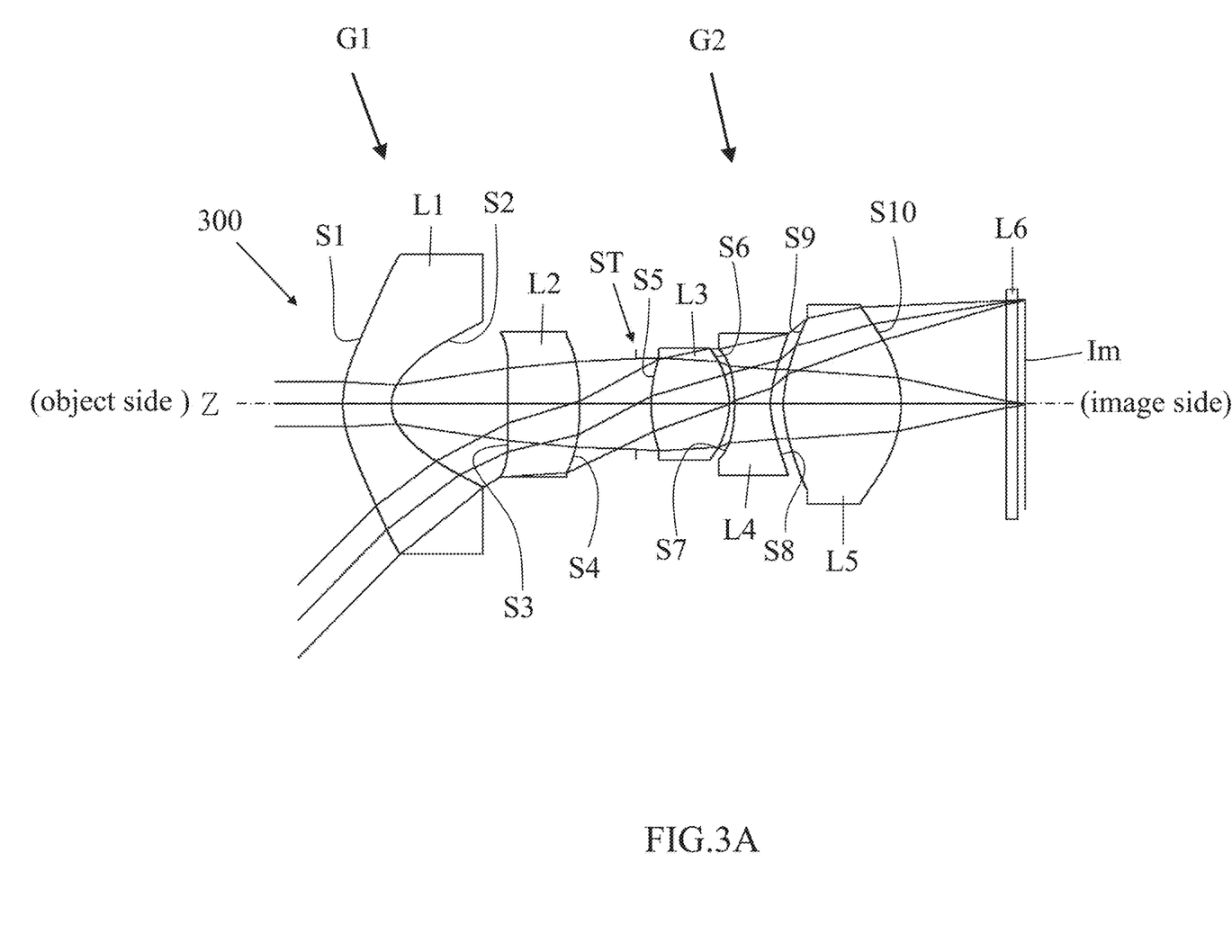
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first lens assembly G1, an aperture ST, and a second lens assembly G2. In the current embodiment, the first lens assembly G1 includes, in order along the optical axis Z from the object side to the image side, a first lens L1 and a second lens L2; the second lens assembly G2 includes, in order along the optical axis Z from the object side to the image side, a third lens L3, a fourth lens L4, and a fifth lens L5.

The first lens L1 is a negative meniscus with negative refractive power; an object-side surface S1 of the first lens L1 is a convex surface toward the object side, and an image-side surface S2 of the first lens L1 is a concave surface toward the image side. The object-side surface S1, the image-side surface S2, or both of the object-side surface S1 and the image-side surface S2 of the first lens L1 are aspheric surfaces. As shown in FIG. 3A, in the current embodiment, a part of a surface of the first lens L1 toward the image side is recessed to form the image-side surface S2, and the optical axis Z passes through the object-side surface S1 and the image-side surface S2 of the first lens L1, and both of the object-side surface S1 and the image-side surface S2 of the first lens L1 are aspheric surfaces.

The second lens L2 is a biconvex lens (i.e., both of an object-side surface S3 of the second lens L2 and an image-side surface S4 of the second lens L2 are convex surfaces) with positive refractive power, wherein the object-side surface S3, the image-side surface S4, or both of the object-side surface S3 and the image-side surface S4 of the second lens L2 are aspheric surfaces. As shown in FIG. 3A, in the current embodiment, the optical axis Z passes through the object-side surface S3 and the image-side surface S4 of the second lens L2, and both of the object-side surface S3 and the image-side surface S4 of the second lens L2 are aspheric surfaces.

The third lens is a biconvex lens (i.e., both of an object-side surface S5 of the third lens L3 and an image-side surface S6 of the third lens L3 are convex surfaces) with positive refractive power, wherein the object-side surface S5, the image-side surface S6, or both of the object-side surface S5 and the image-side surface S6 of the third lens L3 are aspheric surfaces. As shown in FIG. 3A, in the current embodiment, a part of a surface of the third lens L3 toward the object side is convex to form the object-side surface S5, and the optical axis Z passes through the object-side surface S5 and the image-side surface S6 of the third lens L3, and both of the object-side surface S5 and the image-side surface S6 of the third lens L3 are aspheric surfaces.

The fourth lens L4 is a biconcave lens (i.e., both of an object-side surface S7 of the fourth lens L4 and an image-side surface S8 of the fourth lens L4 are concave surfaces) with negative refractive power, wherein the object-side surface S7, the image-side surface S8, or both of the object-side surface S7 and the image-side surface S8 of the fourth lens L4 are aspheric surfaces. As shown in FIG. 3A, in the current embodiment, a part of a surface of the fourth lens L4 toward the object side is recessed to form the object-side surface S7, and the optical axis Z passes through the object-side surface S7 and the image-side surface S8 of the fourth lens L4, and both of the object-side surface S7 and the image-side surface S8 of the fourth lens L4 are aspheric surfaces.

The fifth lens L5 is a biconvex lens (i.e., both of an object-side surface S9 of the fifth lens L5 and an image-side surface S10 of the fifth lens L5 are convex surfaces) with positive refractive power, wherein the object-side surface S9, the image-side surface S10, or both of the object-side surface S9 and the image-side surface S10 of the fifth lens L5 are aspheric surfaces. As shown in FIG. 3A, in the current embodiment, a part of a surface of the fifth lens L5 toward the object side is recessed to form the object-side surface S9, and the optical axis Z passes through the object-side surface S9 and the image-side surface S10 of the fifth lens L5, and both of the object-side surface S9 and the image-side surface S10 of the fifth lens L5 are aspheric surfaces.

Additionally, the optical imaging lens 300 further includes an infrared filter L6, wherein the infrared filter L6 is disposed between the fifth lens L5 and an image plane Im of the optical imaging lens 300, thereby filtering out excess infrared rays in an image light passing through the first lens assembly G1 and the second lens assembly G2.

In order to keep the optical imaging lens 300 in good optical performance and high imaging quality, the optical imaging lens 300 further satisfies:

(1) −5<fg1/F<−3.5;
(2) −2<f1/F<−1; 3.5<f2/F<5.5;
(3) 1.5<fg2/F<2.5;
(4) 1<f3/F<1.8; −1.5<f4/F<−0.5; 1<f5/F<2;
(5) −3<fg1/fg2<−1.5;

wherein F is a focal length of the optical imaging lens 300; f1 is a focal length of the first lens L1; f2 is a focal length of the second lens L2; f3 is a focal length of the third lens L3; f4 is a focal length of the fourth lens L4; f5 is a focal length of the fifth lens L5; fg1 is a focal length of the first lens assembly G1; fg2 is a focal length of the second lens assembly G2.

Parameters of the optical imaging lens 300 of the third embodiment of the present invention are listed in following Table 7, including the focal length F of the optical imaging lens 300 (also called an effective focal length (EFL)), a F-number (Fno), a maximal field of view (FOV), a radius of curvature (R) of each lens, a distance (D) between each surface and the next surface on the optical axis Z, a refractive index (Nd) of each lens, an Abbe number (Vd) of each lens, the focal length of each lens, wherein a unit of the focal length, the radius of curvature, and the distance is millimeter (mm). The data listed below are not a limitation of the present invention, wherein the parameters that could be appropriate changed by one with ordinary skill in the art after referring the present invention should still fall within the scope of the present invention.

TABLE 7

F = 2.949 mm; Fno = 2.15; FOV = 88 deg

| Surface | R(mm) | D(mm) | Nd | Vd | Focal length | Note |
|---|---|---|---|---|---|---|
| S1 | 3.31 | 1.35 | 1.53 | 56.28 | −4.407 | L1 |
| S2 | 1.17 | 3.25 | | | | |
| S3 | 33.39 | 2.00 | 1.64 | 23.97 | 12.054 | L2 |
| ST | −9.80 | 1.58 | | | | |
| S4 | Infinity | 0.43 | | | | ST |
| S5 | 4.68 | 2.17 | 1.53 | 56.28 | 3.604 | L3 |
| S6 | −2.68 | 0.15 | | | | |
| S7 | −5.69 | 1.00 | 1.64 | 23.97 | −2.611 | L4 |
| S8 | 2.53 | 0.36 | | | | |
| S9 | 3.04 | 3.29 | 1.53 | 56.28 | 3.910 | L5 |
| S10 | −4.00 | 2.94 | | | | |
| S11 | Infinity | 0.3 | 1.52 | 64.17 | | Infrared filter L6 |
| Im | Infinity | 0.23 | | | | Im |

It can be seen from Table 9 that, in the current embodiment, the focal length F of the optical imaging lens 300 is 2.949 mm, and the Fno is 2.15, and the FOV is 88 degrees, wherein f1=−4.407 mm; f2=12.054 mm; f3=3.604 mm; f4=−2.611 mm; f5=3.910 mm; fg1=−13.106 mm; fg2=5.434 mm.

Additionally, based on the above detailed parameters, detailed values of the aforementioned conditional formula in the third embodiment are as follows: fg1/F=−4.44; f1/F=−1.49; f2/F=4.09; fg2/F=1.84; f3/F=1.22; f4/F=−0.89; f5/F=1.33; fg1/fg2=−2.41.

With the aforementioned design, the first lens assembly G1 and the second lens assembly G2 satisfy the aforementioned conditions (1) to (5) of the optical imaging lens 300.

Moreover, an aspheric surface contour shape Z of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 300 according to the third embodiment could be obtained by following formula:

$$Z = \frac{ch^2}{1 + \sqrt{1-(1+k)c^2h^2}} + A_4 h^4 + A_6 h^6 + A_8 h^8 + A_{10} h^{10} + A_{12} h^{12} + A_{14} h^{14} + A_{16} h^{16}$$

wherein Z is aspheric surface contour shape; c is reciprocal of radius of curvature; h is half the off-axis height of the surface; k is conic constant; A4, A6, A8, A10, A12, A14, and A16 respectively represents different order coefficient of h.

The conic constant k of each of the object-side surface S1 of the first lens L1 to the object-side surface S9 of the fifth lens L5 (i.e., the object-side surfaces S1, S3, S5, S7 and S9), and the image-side surface S2 of the first lens L1 to the image-side surface S10 of the fifth lens L5 (i.e., the image-side surfaces S2, S4, S6, S8 and S10) of the optical imaging lens 300 according to the third embodiment and the different order coefficient of A4, A6, A8, A10, A12, A14, and A16 are listed in following Table 8 and Table 9:

TABLE 8

| Surface | S1 | S2 | S3 | S4 | S5 |
|---|---|---|---|---|---|
| k | −8.5917E−01 | −9.7309E−01 | −9.0000E+01 | 4.4110E+00 | −4.9412E+00 |
| A4 | −1.0007E−02 | −9.7991E−03 | −6.6392E−03 | −6.8411E−03 | 4.5995E−03 |
| A6 | 5.5402E−04 | 1.7424E−03 | −1.0708E−03 | 1.1870E−05 | 5.1742E−04 |
| A8 | −2.1232E−05 | −4.3864E−04 | 1.8765E−04 | −4.0772E−05 | −1.4844E−03 |
| A10 | 4.7016E−07 | 7.9478E−05 | −6.8585E−05 | 1.7126E−05 | 7.5818E−04 |
| A12 | −4.0694E−09 | −6.6305E−06 | 7.1856E−06 | −1.1859E−06 | −1.7651E−04 |
| A14 | 0 | 0 | 0 | 0 | 0 |
| A16 | 0 | 0 | 0 | 0 | 0 |

TABLE 9

| Surface | S6 | S7 | S8 | S9 | S10 |
|---|---|---|---|---|---|
| k | −1.0132E+01 | −9.0747E+00 | −1.0890E+01 | −1.1156E+01 | 1.7390E−01 |
| A4 | −2.3534E−02 | −8.7318E−03 | 9.1350E−04 | −1.0438E−03 | 2.0464E−04 |
| A6 | −1.5962E−05 | −1.2252E−02 | −6.8479E−04 | 7.7448E−04 | 3.7024E−04 |
| A8 | −3.8409E−04 | 4.0220E−03 | 2.9838E−04 | −7.5335E−05 | −2.9976E−05 |
| A10 | 1.4488E−04 | −9.4802E−04 | −5.6064E−05 | 2.9930E−06 | 3.6866E−06 |
| A12 | −3.1514E−05 | 9.4800E−05 | 3.7356E−06 | −2.4778E−17 | −2.5585E−17 |
| A14 | 0 | 0 | 0 | 0 | 0 |
| A16 | 0 | 0 | 0 | 0 | 0 |

Figure 3B:
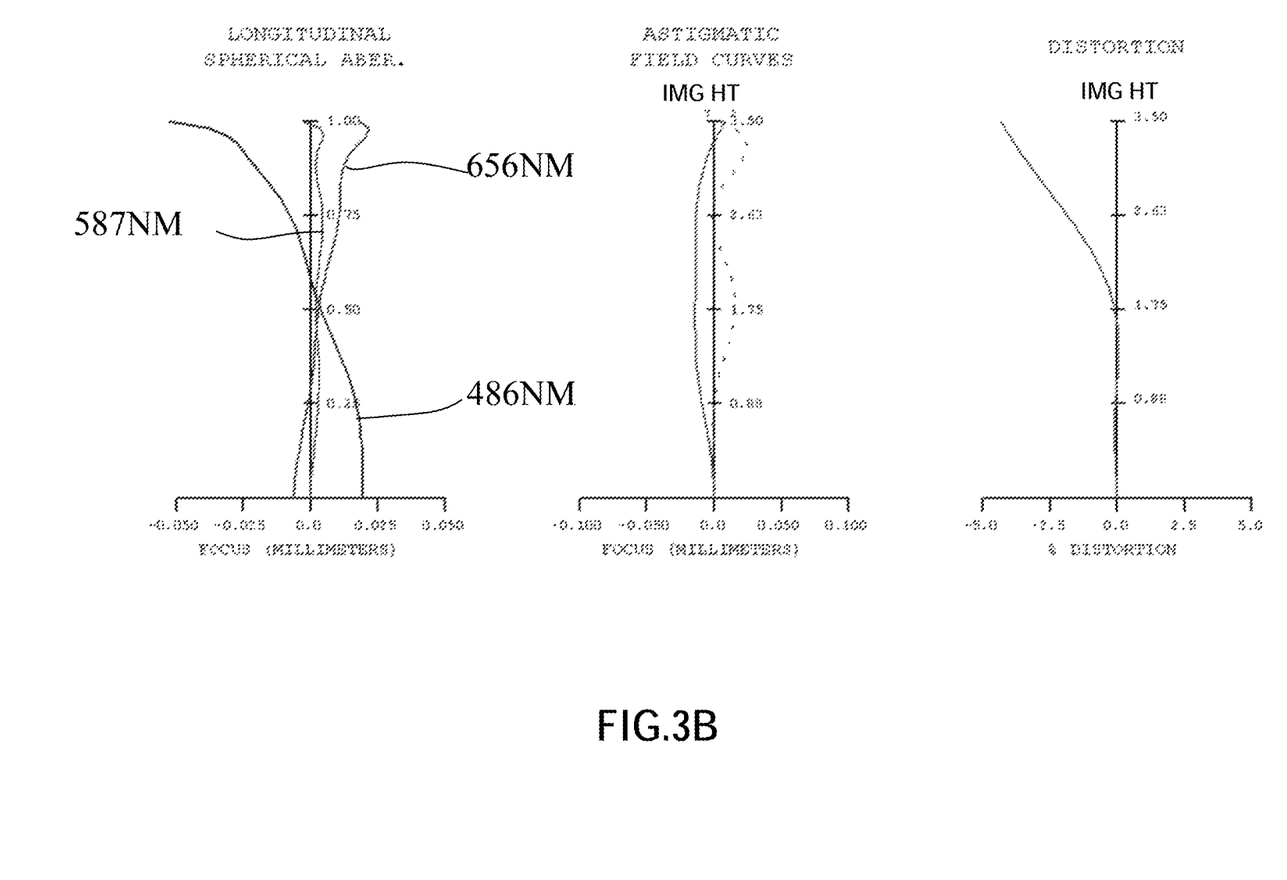
FIG. 3B shows curve diagrams of longitudinal spherical aberration, astigmatic field curves, and distortion in order from left to right according to the first embodiment of the present invention.

Taking optical simulation data to verify the imaging quality of the optical imaging lens 300, wherein FIG. 3B is a diagram showing the longitudinal spherical aberration, astigmatic field curves, and distortion according to the first embodiment, which could effectively enhance image quality.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, the optical imaging lens consisting of five lenses with refractive power and being arranged as follows:

a first lens assembly comprising, in order from the object side to the image side along the optical axis, a first lens having negative refractive power and a second lens which is a biconvex lens having positive refractive power, wherein an object-side surface of the first lens is a convex surface toward the object side, and an image-side surface of the first lens is a concave surface toward the image side; the object-side surface of the first lens and/or the image-side surface of the first lens are/is an aspheric surface; the object-side surface of the second lens and/or the image-side surface of the second lens are/is an aspheric surface;

an aperture;

a second lens assembly comprising, in order from the object side to the image side along the optical axis, a third lens which is a biconvex lens having positive refractive power, a fourth lens that is a biconcave lens having negative refractive power, and a fifth lens that is a biconvex lens having positive refractive power, wherein an object-side surface of the third lens and/or an image-side surface of the third lens are/is an aspheric surface; an object-side surface of the fourth lens and/or an image-side surface of the fourth lens are/is an aspheric surface; an object-side surface of the fifth lens and/or an image-side surface of the fifth lens are/is an aspheric surface;

wherein the optical imaging lens satisfies: −5<fg1/F<−3.5; F is a focal length of the optical imaging lens and fg1 is a focal length of the first lens assembly.

2. The optical imaging lens as claimed in claim 1, wherein the optical imaging lens satisfies: −2<f1/F<−1, wherein f1 is a focal length of the first lens.

3. The optical imaging lens as claimed in claim 1, wherein the optical imaging lens satisfies: 3.5<f2/F<5.5, wherein f2 is a focal length of the second lens.

4. The optical imaging lens as claimed in claim 1, wherein the optical imaging lens satisfies: 1<f3/F<1.8, wherein f3 is a focal length of the third lens.

5. The optical imaging lens as claimed in claim 1, wherein the optical imaging lens satisfies: −1.5<f4/F<−0.5, wherein f4 is a focal length of the fourth lens.

6. The optical imaging lens as claimed in claim 1, wherein the optical imaging lens satisfies: 1<f5/F<2, wherein f5 is a focal length of the fifth lens.

7. The optical imaging lens as claimed in claim 1, wherein the optical imaging lens satisfies: 1.5<fg2/F<2.5, wherein fg2 is a focal length of the second lens assembly.

8. The optical imaging lens as claimed in claim 1, wherein the optical imaging lens satisfies: −3<fg1/fg2<−1.5, wherein fg2 is a focal length of the second lens assembly.

9. The optical imaging lens as claimed in claim 1, wherein both of the object-side surface and the image-side surface of the first lens are aspheric surfaces.

10. The optical imaging lens as claimed in claim 1, wherein both of the object-side surface and the image-side surface of the second lens are aspheric surfaces.

11. The optical imaging lens as claimed in claim 1, wherein both of the object-side surface and the image-side surface of the third lens are aspheric surfaces.

12. The optical imaging lens as claimed in claim 1, wherein both of the object-side surface and the image-side surface of the fourth lens are aspheric surfaces.

13. The optical imaging lens as claimed in claim 1, wherein both of the object-side surface and the image-side surface of the fifth lens are aspheric surfaces.

* * * * *